United States Patent
Schlegel et al.

(10) Patent No.: US 11,384,785 B2
(45) Date of Patent: Jul. 12, 2022

(54) PUSH-BUTTON LOCK FOR PLUG-IN CONNECTOR HOUSING

(71) Applicant: HARTING ELECTRIC GMBH & CO. KG, Espelkamp (DE)

(72) Inventors: Bernard Schlegel, Rahden (DE); Horst Huelsmeyer, Espelkamp (DE); Frank Bussmann, Bad Oeyenhausen (DE)

(73) Assignee: HARTING ELECTRIC GMBH & CO. KG

( * ) Notice: Subject to any disclaimer, the term of this patent is extended or adjusted under 35 U.S.C. 154(b) by 324 days.

(21) Appl. No.: 16/629,503

(22) PCT Filed: Aug. 7, 2018

(86) PCT No.: PCT/DE2018/100693
§ 371 (c)(1),
(2) Date: Jan. 8, 2020

(87) PCT Pub. No.: WO2019/034202
PCT Pub. Date: Feb. 21, 2019

(65) Prior Publication Data
US 2021/0131472 A1    May 6, 2021

(30) Foreign Application Priority Data
Aug. 18, 2017 (DE) ...................... 10 2017 118 918.1

(51) Int. Cl.
*H01R 13/637* (2006.01)
*F16B 21/16* (2006.01)
(Continued)

(52) U.S. Cl.
CPC ....... *F16B 21/165* (2013.01); *H01R 13/6276* (2013.01); *H01R 13/639* (2013.01)

(58) Field of Classification Search
CPC .. F16B 21/165; H01R 13/6276; H01R 13/639
(Continued)

(56) References Cited

U.S. PATENT DOCUMENTS

| 1,965,939 | A | * | 7/1934 | Jacobi | ............ E05B 83/30 70/DIG. 4 |
| 3,046,513 | A | * | 7/1962 | Crowley | ............ H01R 13/6272 439/347 |

(Continued)

FOREIGN PATENT DOCUMENTS

| CA | 2 686 893 | 6/2010 | ............. E05B 57/00 |
| CN | 101748941 | 6/2010 | ............. E05B 65/00 |

(Continued)

OTHER PUBLICATIONS

German Office Action (w/machine translation) issued in application No. 10 2017 118 918.1, dated Jun. 28, 2018 (10 pgs).
(Continued)

*Primary Examiner* — Neil Abrams
(74) *Attorney, Agent, or Firm* — Hayes Soloway P.C.

(57) ABSTRACT

Disclosed is a push-button lock for locking a plug-in connector housing. The lock has a push-button body with a cylindrical unlocking recess containing an unlocking pin. The appropriate interaction of an outer contour of the unlocking pin, an inner contour of a through-opening of the plug-in connector housing and the push-button body by at least one locking element and two springs allows the plug-in connector housing to be locked and unlocked with great ease of use, the operating concept being particularly self-explanatory.

22 Claims, 5 Drawing Sheets

Figure 1A:
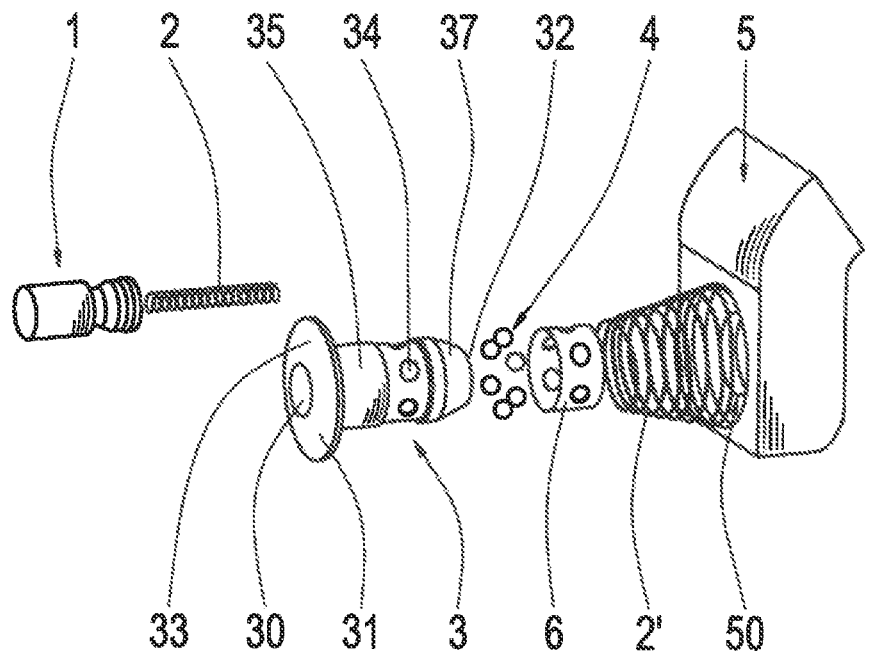

(51) Int. Cl.
  *H01R 13/627* (2006.01)
  *H01R 13/639* (2006.01)
(58) Field of Classification Search
  USPC .......................................................... 439/347
  See application file for complete search history.

(56) References Cited

U.S. PATENT DOCUMENTS

| | | | | |
|---|---|---|---|---|
| 4,120,553 | A | 10/1978 | Muz | 339/91 R |
| 4,146,682 | A * | 3/1979 | Nakao | H01M 50/213 439/352 |
| 4,179,143 | A * | 12/1979 | Shy | E05C 1/04 292/179 |
| 4,227,762 | A * | 10/1980 | Scheiner | H01R 13/627 439/368 |
| 4,774,399 | A * | 9/1988 | Fujita | G06K 7/0047 235/441 |
| 4,843,477 | A * | 6/1989 | Mizutani | B60R 11/0235 361/679.01 |
| 4,941,841 | A * | 7/1990 | Darden | H05K 5/0286 439/304 |
| 5,207,544 | A * | 5/1993 | Yamamoto | E05B 63/121 411/21 |
| 5,220,520 | A * | 6/1993 | Kessoku | G06F 1/30 D10/65 |
| 5,409,393 | A * | 4/1995 | Perkins | H01R 13/62 439/346 |
| 5,474,309 | A | 12/1995 | Balsells | 277/163 |
| 5,588,862 | A * | 12/1996 | Perkins | H01R 13/6278 439/346 |
| 5,603,630 | A * | 2/1997 | Villain | H01Q 1/1214 439/352 |
| 5,615,250 | A * | 3/1997 | Kobayashi | H04M 1/0262 379/357.01 |
| 5,658,162 | A | 8/1997 | Harting et al. | 439/372 |
| 5,716,730 | A * | 2/1998 | Deguchi | H04B 1/3883 429/97 |
| 5,845,898 | A | 12/1998 | Halder et al. | 269/48.1 |
| 5,860,302 | A * | 1/1999 | James | E05C 19/06 70/168 |
| 5,865,640 | A * | 2/1999 | Tadokoro | H01R 13/707 439/911 |
| 5,903,132 | A * | 5/1999 | Ohira | H01M 50/20 320/112 |
| 5,993,240 | A | 11/1999 | Schaefer | 439/359 |
| 6,168,881 | B1 * | 1/2001 | Fischer | H01M 50/204 429/97 |
| 6,356,053 | B1 * | 3/2002 | Sandoz | H02J 7/0044 439/310 |
| 6,450,828 | B1 * | 9/2002 | Gordon | H04N 5/64 439/700 |
| 6,469,900 | B2 * | 10/2002 | Cheng | G06F 1/1616 361/740 |
| 6,757,172 | B2 * | 6/2004 | Maruyama | G06K 7/00 361/740 |
| 6,767,230 | B2 * | 7/2004 | Lai | H01R 12/7029 439/153 |
| 6,942,514 | B1 * | 9/2005 | Cheng | H01R 12/7029 439/328 |
| 6,943,527 | B2 * | 9/2005 | Liu | H01M 50/284 320/112 |
| 7,080,889 | B2 * | 7/2006 | Ling | H01R 13/6397 200/50.02 |
| 7,364,452 | B2 * | 4/2008 | Carver | H01R 43/26 439/310 |
| 7,817,414 | B2 * | 10/2010 | Chou | G06F 1/1632 361/679.56 |
| 8,092,241 | B2 * | 1/2012 | Chang | H01R 13/70 439/38 |
| 8,328,562 | B1 * | 12/2012 | Rassoolkhani | H01R 11/18 320/104 |
| 8,444,190 | B2 * | 5/2013 | Schmidt | E05B 13/105 292/303 |
| 8,498,123 | B2 * | 7/2013 | Kawada | G06F 1/1658 361/740 |
| 8,549,724 | B2 * | 10/2013 | Davies | F16B 19/1081 411/21 |
| 8,591,160 | B2 | 11/2013 | Shinozaki | 411/347 |
| 8,951,060 | B2 * | 2/2015 | Meyer-Ebeling | B60L 53/16 320/109 |
| 8,961,213 | B2 * | 2/2015 | Retailleau | H01R 13/635 439/345 |
| 9,093,789 | B2 * | 7/2015 | Aoki | H01R 13/701 |
| 9,228,602 | B2 | 1/2016 | Kelly et al. | F16B 21/073 |
| 9,312,630 | B2 | 4/2016 | Huang | H01R 13/62 |
| 9,458,868 | B2 | 10/2016 | Mettern et al. | F16B 5/0621 |
| 9,482,255 | B2 | 11/2016 | Changsrivong et al. | F16B 17/00 |
| 9,829,028 | B2 | 11/2017 | Changsrivong et al. | F16B 21/125 |
| 10,320,100 | B2 * | 6/2019 | Phillips | H01R 12/7005 |
| 10,826,235 | B2 * | 11/2020 | Shain | H04N 5/23299 |
| 10,975,982 | B2 * | 4/2021 | Wilhelm | F16K 35/025 |
| 2008/0250550 | A1 | 10/2008 | Bologna et al. | 2/425 |
| 2012/0301248 | A1 | 11/2012 | Arnold et al. | 411/347 |
| 2013/0149031 | A1 | 6/2013 | Changsrivong et al. | F16B 17/00 |
| 2013/0210258 | A1 | 8/2013 | Retailleau et al. | H01R 13/639 |
| 2013/0330120 | A1 | 12/2013 | Blanchard | F16B 21/165 |
| 2014/0130329 | A1 | 5/2014 | Changsrivong et al. | F16B 17/00 |
| 2016/0032952 | A1 | 2/2016 | McBroom et al. | F16G 5/06 |
| 2020/0224701 | A1 * | 7/2020 | Schlegel | F16B 5/0642 |
| 2020/0321729 | A1 * | 10/2020 | Schlegel | H01R 13/6277 |
| 2021/0131472 | A1 * | 5/2021 | Schlegel | F16B 21/165 |

FOREIGN PATENT DOCUMENTS

| | | | |
|---|---|---|---|
| CN | 101981329 | 2/2011 | F16B 19/00 |
| CN | 103375460 | 10/2013 | F16B 21/08 |
| CN | 103748367 | 4/2014 | F16B 5/06 |
| CN | 104121264 | 10/2014 | F16B 21/00 |
| DE | 7343790 | 3/1974 | H01R 13/48 |
| DE | 69206597 | 5/1996 | B60R 21/20 |
| DE | 19643708 | 4/1998 | F16B 19/10 |
| DE | 102008060561 | 7/2010 | H05K 5/02 |
| EP | 0379159 | 7/1990 | H05K 9/00 |
| EP | 0731534 | 9/1996 | H01R 13/629 |
| EP | 2194217 | 6/2010 | E05B 13/10 |
| EP | 2259383 | 12/2010 | H01R 13/187 |
| EP | 2733366 | 5/2014 | F16B 21/06 |
| EP | 2746599 | 6/2014 | F16B 21/06 |
| EP | 2801726 | 11/2014 | F16B 21/16 |
| EP | 2602494 | 7/2017 | A61N 1/375 |
| WO | WO2009126968 | 10/2009 | F16L 39/00 |

OTHER PUBLICATIONS

International Search Report (w/translation) and Written Opinion (w/machine translation) issued in application No. PCT/DE2018/100693, dated Nov. 16, 2018 (19 pgs).
Krause, W., Design elements of pure mechanics, vol. 1, 3 (no translation available), updated edition. Munich: Hauser 2004, pp. 448-449 (3 pgs).
International Preliminary Report on Patentability (English translation) issued in application No. PCT/DE2018/100693, dated Feb. 27, 2020 (10 pgs).
U.S. Appl. No. 16/610,443, filed Nov. 1, 2019, Schlegel.
U.S. Appl. No. 16/639,034, filed Feb. 13, 2020, Schlegel.
German Office Action (w/machine translation) issued in application No. 10 2018 101 789.8, dated Dec. 19, 2018 (10 pgs).
German Office Action (w/machine translation) issued in application No. 10 2017 130 005.8, dated Jul. 18, 2018 (7 pgs).
International Search Report and Written Opinion (w/translation) issued in application No. PCT/DE2018/100978, dated Mar. 22, 2019 (16 pgs).

(56) References Cited

OTHER PUBLICATIONS

International Search Report and Written Opinion (w/translations) issued in application No. PCT/DE2018/100694, dated Nov. 19, 2018 (17 pgs).
International Preliminary Report on Patentability (English translation) issued in application No. PCT/DE2018/100694, dated Feb. 18, 2020 (8 pgs).
International Preliminary Report on Patentability (English translation) issued in application No. PCT/DE2018/100978, dated Jun. 16, 2020 (8 pgs).
Chinese Office Action issued in Chinese Patent Appln. No. 201880071664.3, dated Feb. 22, 2021, with machine English translation, 10 pages.
Chinese Office Action issued in Chinese Patent Appln. No. 201880053305.5, dated Feb. 3, 2021, with English translation, 12 pages.
Chinese Office Action issued in Chinese Patent Appln. No. 201880068304.8, dated Mar. 17, 2021, with English translation, 13 pages.

\* cited by examiner

PUSH-BUTTON LOCK FOR PLUG-IN CONNECTOR HOUSING

The invention proceeds from a push-button lock for a plug-in connector housing according to the genus of independent main claim 1.

The invention also proceeds from a method for unlocking a plug-in connector housing according to the genus of independent method claim 17.

In addition, the invention proceeds from a method for locking a plug-in connector housing according to the genus of independent method claim 20.

Such push-button locks are required in order to be able to lock and unlock a plug-in connector in a convenient manner.

PRIOR ART

Locks for plug-in connectors are known in the prior art.

Publication EP 0 731 534 B1 discloses a U-shaped locking clip which is pivotable about bearing journals of one housing half. The U-shaped locking clip has pockets into each of which a spring element is inserted. Said spring elements act in such a manner on the locking journals of the other housing half when the locking clip is closed that the housing halves are pressed against one another in a resilient manner. In addition, the use of a rocker-arm-like locking element is disclosed as an advantageous design. High holding forces are made possible by said invention with low operating forces.

A genus-forming locking device for an at least two-part housing is described in publication DE 10 2008 060 561 A1. An actuating button, which is operable from the outside, is arranged in each case inside circular moldings on at least one of two oppositely situated side walls of the housing upper part. The actuating button is realized as a combined turn and push button and is in engagement with a spring lever arranged in the interior of the housing upper part. The spring lever brings about a latching and/or a locking connection between the two housing parts depending on the position of the actuating button. Additionally disclosed is that the actuating button is arranged inside a circular molding. A circular ring seal, which is marked in color, is situated therein. Said color marking highlights the locking connection between the two housing parts.

A disadvantage in the case of said prior art is that operation requires a relatively large amount of effort and is unfortunately not immediately self-explanatory to everyone.

In the priority application to the present application, the German Patent and Trademark Office has researched the following prior art: EP 2 801 726 B1, CN 103 375 460 A, DE 196 43 708 C2, DE 10 2008 060 561 A1.

In addition, the following non-patent literature has been researched: Krause, Werner: Design elements of pure mechanics, Vol. 1, 3., updated edition. Munich: Hanser 2004, Page 448-449.

DEFINITION OF THE PROBLEM

The object of the invention consists in providing a particularly convenient push-button lock, the operation of which is easily understandable, for a plug-in connector housing.

Said object is achieved by the features of the independent claims.

Advantageous designs of the invention are provided in the subclaims.

The push-button lock for the plug-in connector housing comprises at least the following.

a. a push-button body which, beginning at its first end and extending in the direction of its opposite second end, has an unlocking opening for receiving an unlocking pin;

b. the unlocking pin, which is arranged in the unlocking opening so as to be movable relative to the push-button body, is actuatable as a result and in its non-actuated position is able to fulfill a function locking the plug-in connector housing and in its actuated position is able to fulfill a function unlocking the plug-in connector housing;

c. a first spring for applying a first restoring force for transferring the unlocking pin from its actuated position into its non-actuated position;

d. a second spring for generating a second restoring force, for transferring the push-button body from a position locking the plug-in connector housing into a position unlocking the plug-in connector housing;

e. at least one locking element which is arranged so as to be movable at least in regions in or on the push-button body for interacting with the unlocking pin, the push-button body and the plug-in connector housing.

The plug-in connector housing can consist of at least two housing parts, wherein at least one of the two housing parts comprises a through-opening in each case on two housing walls situated opposite one another. One push-button body each can be arranged so as to be movable in each of said through-openings. Said two push-button bodies, depending on the position of the unlocking pin, are able to be movable manually toward one another for locking the plug-in connector housing or automatically, in particular by means of the said second spring, away from one another for correspondingly unlocking said plug-in connector housing.

On the one hand, the unlocking pin, in particular in its non-actuated position, can be capable of fixing the push-button body to the plug-in connector housing. It is particularly advantageous when the push-button body is situated, in this case, in its position locking the plug-in connector housing. Finally, the unlocking pin then also has—at least indirectly—a function locking the plug-in connector housing.

On the other hand, the unlocking pin, for example in its actuated position, can be capable of releasing the push-button body, when it is in its locking position, from the plug-in connector housing so that the push-button body can be transferred automatically into its non-locking position by means of the second restoring spring. The unlocking pin consequently also has an unlocking function for the plug-in connector housing.

In addition, the unlocking pin can also hold the push-button body, in the non-locking position thereof, on the plug-in connector housing so as to be releasably latching so that the push-button body is not pressed further out of the plug-in connector housing by the second restoring force. In particular, the unlocking pin can be situated in a holding position for this purpose. It can bring about said function in particular as a result of simultaneous interaction between its own outside contour and the locking element and an inside contour of the through-opening of the plug-in connector housing.

In a preferred design, the push-button body can have at least one locking opening for the at least partial receiving of the at least one locking element, the at least one locking opening connecting the surface of the push-button body to its unlocking opening. The locking element can then be arranged so as to be movable, in particular radially, in the locking opening of the push-button body. Radially, in this case, means at right angles to the direction of movement of the push-button body.

As a result of its outside contour, the unlocking pin interacts, in principle, with the at least one locking element in order to move the locking element to a greater or lesser distance out of the push-button body through the respective locking opening or to insert it—expressed in reverse—to a greater or lesser depth in the push-button body. Consequently, the locking element is able to interact with the outside contour of the unlocking pin. The locking element is otherwise also able to interact with an inside contour of the through-opening. Consequently, various mechanical holding, locking and unlocking states of the push-button body on the plug-in connector housing and of the unlocking pin on the push-button body are able to be generated when the inside contour of the through-opening and the outside contour of the unlocking pin interact by means of the at least one locking element.

Firstly, the unlocking pin is able to be fixed on the push-button body or separated from the same in the aforementioned manner. Secondly, the push-button body is also able to be fixed on the plug-in connector housing or released from it as a result. In addition, the push-button body, in particular in its unlocking position, is able to be held releasably on the plug-in connector housing. The respective precise functionality of said push-button mechanism can be designed for the corresponding application in a particularly advantageous manner, in particular as a result of the shaping of the inside contour of the through-opening and of the outside contour of the unlocking pin.

The outside contour of the unlocking pin can interact with the at least one locking element in order to move the at least one locking element in the associated locking opening, in particular radially, that is to say perpendicularly to the direction of movement of the push-button body, i.e. inward or outward, that is to say into or out of the push-button body. This is particularly advantageous because the locking element is able to be inserted to a greater or lesser depth in the push-button body, for example as a result of interacting with the outside contour of the unlocking pin, or—put another way—can be pressed to a greater or lesser distance out of the push-button body in order to fix the push-button body to the plug-in connector housing or to release it from the same. In reverse, the inside contour of the through-opening of the plug-in connector housing can press the at least one locking element into the push-button body in order to fix the locking element, for example when moving the push-button body through the through-opening, in its corresponding unlocking position on the push-button body or to release it again, for example in the locking position of the push-button body, so that it springs back into its non-actuated position as a result of the first restoring force and is available for its next actuation.

In particular, the inside contour of the through-opening can be designed in a rectilinear manner in cross section over an entire region. In particular, the through-opening can have a cylindrical region for this purpose. The unlocking pin can then be fixed to the push-button body as long as the push-button body is moved with the locking element/the corresponding locking opening over said cylindrical region. Put simply in other words: The unlocking pin can be entrained with the push-button body relative to the plug-in connector housing in said region for it is held on the push-button body by the locking element In addition, it is particularly advantageous when the outside contour of the unlocking pin includes one or multiple unlocking recesses. Said unlocking recesses can compose a restoring chamfer in an advantageous manner.

The advantage of the unlocking recess is that the unlocking pin can thereby ensure, in the case of corresponding positioning, that the locking element is inserted deeper into the push-button body and consequently releases the push-button body from the plug-in connector housing.

The restoring chamfer can achieve, in addition, in particular under the effect of the first restoring force, that the push-button body is held automatically in its non-locking position on the plug-in connector housing. The unlocking pin is then situated in its holding position. Said holding position can be assumed by the unlocking pin as a result of the first spring and by means of a restoring chamfer of its unlocking recess as a result of a slight automatic movement in the direction of its non-actuated position. In this case, the locking element is pressed by the restoring chamfer out of the push-button body into a holding recess of the through-opening, which is provided in the through-opening for this purpose, and it latches releasably thereon as a result of the resilient pressure of the restoring chamfer.

The term "releasably", in this context, means that the push-button body can additionally be plugged manually into the plug-in connector housing by means of pressure against its first end. Finally, in this case, the locking element can move the unlocking pin marginally against the first restoring force of the first spring in order to insert it deeper into the push-button body.

The holding position can consequently be overcome manually as a result of applying an actuating force which acts in the opposite direction to the second restoring force. I.e. the two push-button bodies which, in a preferred manner, are situated opposite one another on the plug-in connector housing, can be moved toward one another out of the non-locking holding position without the necessity of separately actuating the unlocking pin manually, that is to say as a result of simple "compression". The plug-in connector housing can thus be locked, therefore, by manually compressing the two push-button bodies. The actuation of the lock is therefore reduced to simple compression of the push-button bodies. This is particularly advantageous as it ensures a high level of operating convenience and the operating concept is additionally largely self-explanatory.

With the subsequent operation of the locking process, the unlocking pin is first of all moved with the push-button body relative to the plug-in connector housing. In this case, the locking element slides, as described above, along a rectilinear region of the inside contour of the through-opening. By the time it reaches the locking recess, the locking element is first of ail received, however, somewhat deeper into the unlocking recess as a result of the restoring chamfer under the effect of the first restoring force, is inserted therefore, firstly, somewhat deeper into the push-button body again and, secondly, is removed from the locking recess of the through-opening. The unlocking pin thus springs back into its non actuated position as a result of the first restoring force and, with its outside contour, ultimately fixes the push-button body in its locking position on the plug-in housing.

For unlocking, the unlocking pin can be pushed into the push-button body for actuation, for example with a pointed object, for instance a screwdriver, a pin, a nail etc. The advantage of this is that unintentional unlocking is avoided.

In an alternative design, the unlocking pin can also protrude from the push-button body by the push-button body comprising a corresponding length toward the first end of said push-button body. For unlocking, it is then sufficient to insert said unlocking pin manually into the push-button body. Said variant is even more convenient for operation because there is no need for a tool. For the same reason, however, the risk of unintentional unlocking is greater than in the case of the aforementioned variant.

In an advantageous manner, the at least one locking element is a locking ball. The advantage of this, among other things, is that incorrect alignment of the locking element is avoided. Such locking balls cannot tilt, for example, in the locking openings and comprise a round attack surface toward each side, which facilitates the interaction between the unlocking pin and the through-opening in a considerable manner.

The unlocking opening can be realized in a substantially cylindrical manner and the unlocking pin can also realized in a cylindrical manner or can have at least one substantially cylindrical unlocking portion. The diameter of the unlocking pin and/or the diameter of its cylindrical portion can be smaller than or equal to the diameter of the unlocking opening/its unlocking portion, as a result of which the unlocking pin is movable in the direction of the axis of symmetry of said cylinder shape in the push-button body and as a result is actuatable. This is particularly advantageous because it is thus transferrable, in particular manually, from its non-actuated position into its actuated position and/or is transferrable automatically, in particular as a result of the first restoring force, from its actuated position into its non-actuated position.

In particular, it can prove advantageous and expedient for certain arrangements when the unlocking pin is at least half as long as the push-button body and is shorter than the unlocking recess in its direction of movement. As a result, on the one hand, it can be insertable and movable in the unlocking recess and, on the other hand, it is long enough in order to make available the outside contour necessary for the above-described mechanism for interaction with the locking elements. In this case and below, the length of the push-button body is measured, in principle, from its first to its second end.

In a preferred design, the first spring is a spiral spring. Said spiral spring can be arranged in the unlocking opening between the second end of the push-button body and at least on part of the unlocking pin in order to exert said first restoring force on said push-button body. In particular, the unlocking pin, in turn, can have an, in particular substantially cylindrical, receiving recess, for example a bore which extends in the direction of the axis of symmetry of the cylinder shape, in which the spiral spring engages. The advantage of this is that there is more space available in the unlocking recess for the first spring, in particular also in its compressed state.

The second spring cooperates, at the one end, with the plug-in connector housing and, at the other end, with the push-button body. To this end, the push-button body can have a push-button head at its first end. Said push-button head consists of a widening, in particular a disk-like widening, which knocks against the housing in the locked state and thus avoids the push-button body penetrating deeper into the through-opening.

In a preferred manner, the second spring can be a so-called "conical spring" which differs from a usual spiral spring in that the diameter of each spiral continuously changes from that of the preceding one so that the conical spring is tapered or enlarged conically from one end to the other, that is to say—corresponding to its name—is designed in a conical manner. The advantage of using a conical spring is that, on the one hand, it can be adapted to the shape of the plug-in connector housing and, on the other hand, to the shape of the push-button body, in contrast to a simple spiral spring with a constant diameter. A further particular advantage consists in that the conical spring has a smaller space requirement in the compressed state due to its design as the spirals can be arranged ideally in one another and consequently inside a surface.

In an advantageous design, the through-openings can each comprise at least one locking recess which interacts with the locking elements in order to fix the push-button body on the plug-in connector housing or to release it from the same.

In an advantageous manner, said at least one locking recess serves to fix the push-button body in its locking position when an unlocking pin is non-actuated on the plug-in connector housing. To this end, in said position, the unlocking pin presses, with its outside contour, the at least one locking element, in particular the at least one locking ball, into the at least one, in particular circumferential, locking recess, as a result of which the push-button body is fixed on the plug-in connector housing.

In contrast with this, the unlocking pin can be arranged in its actuated position on the at least one locking element with at least one, in particular circumferential, unlocking recess, which is situated on its surface. As a result, the locking element is able to be inserted deeper into the push-button body in order, thus, to remove the at least one locking element out of the locking recess of the plug-in connector housing. The aforementioned fixing of the push-button body is able to be released as a result.

In addition, the push-button body can have a conical progression at its second end in order, thereby, to actuate a further locking/unlocking mechanism of the plug-in connector housing.

A method for unlocking a plug-in connector housing with a push-button lock, in particular a push-button lock as has been described beforehand in various variants and/or with a system produced from such a push-button lock and from the previously described plug-in connector housing, as has been described beforehand in various variants, comprises the following steps:

A. actuating an unlocking pin by manually inserting the unlocking pin into an unlocking opening of a push-button body fixed on the plug-in connector housing in opposition to a first restoring force of a first spring, as a result B. inserting the at least one locking element deeper into the push-button body as a result of interaction between the outside contour of the unlocking pin and the locking element, as a result C. releasing the fixing of the push-button body from the plug-in connector housing as a result of interaction between the locking element and an inside contour of a through-opening in which the push-button body is held so as to be movable, as a result D. transferring the push-button body automatically into a position unlocking the plug-in connector housing as a result of a second restoring force of a second spring.

The method can additionally comprise the following subsequent steps:

E. positioning the at least one locking element at a holding recess of the plug-in connector housing and at the same time press the locking element into the holding recess by means of the first spring interacting with a restoring chamfer of the unlocking pin.

The interaction between the outside contour of the unlocking pin and the locking element described in method step B can advantageously consist in at least one unlocking recess of the unlocking pin moving toward the at least one locking element, thereby making it possible for the at least one locking element to be inserted deeper into the push-button body as stated.

On its second end, the push-button body can have a conical end portion at which it tapers conically toward its second end.

In a further method step F, said conical end portion of the push-button body can interact with an attack chamfer of a locking/unlocking mechanism of the plug-in connector housing.

A method for locking a plug-in connector housing with a push-button lock, in particular a push-button lock as has been described beforehand in various variants and/or with a system produced from such a push-button lock and from the previously described plug-in connector housing, as has been described beforehand in various variants, comprises the following steps:

I. manually pressing at least one firstly unlocked push-button body into a through-opening of a housing side of a plug-in connector housing, in which the push-button body is held so as to be movable; as a result
II. holding an unlocking pin received in the push-button body automatically in a position fixing the unlocking pin on the push-button body;
III. moving the push-button body with its at least one locking opening and with an at least one locking element received therein to a locking recess of the through-opening;
IV. fixing the push-button body on the plug-in connector housing in its locking position as a result of interaction between the respective unlocking pin, the respective push-button body and the respective through-opening and the at least one locking element by means of the locking recess of the through-opening.

In method steps II and III, the unlocking pin can be fixed on the push-button body by means of the locking element, in particular as a result of interaction between the locking element and the inside contour of the through-opening of the plug-in connector housing, which, for this purpose, presses the locking element deeply enough into the push-button body in order to hold the unlocking pin in its unlocking recess on the push-button body, also during the movement of the push-button body described in step III over the region necessary for this.

In addition, in method step IV, the push-button body can be fixed on the plug-in connector housing as a result of interaction between the locking element and an outer contour of the unlocking pin. In particular, the locking element, which in a preferred manner is a locking ball, slides deeper into the locking recess of the inside contour of the through-opening of the plug-in connector housing as a result of interaction with the restoring chamfer under the action of the first restoring force and consequently releases the unlocking pin on its opposite side. The unlocking pin can thus spring into its non-actuated position by means of the first restoring force and thus fix the locking element in the locking recess and consequently the push-button body on the plug-in connector housing in its locking position. The unlocking pin is consequently also situated, therefore, in a position locking the plug-in connector housing, which corresponds to its non-actuated position.

In method step IV, said conical end portion can interact with a further locking/unlocking mechanism of the plug-in connector housing.

The two housing parts can thus be locked to one another and, in addition, can be pressed against one another for sealing purposes by means of the conical end portion as a result of pressing-in the push-button body, in particular by means of said locking/unlocking mechanism.

Consequently, the plug-in connector housing is both locked and also compressed in a sealing manner with one single action, for example as a result of compressing two push-button bodies which are arranged opposite one another on the plug-in connector, which represents a particular advantage in operation.

EXEMPLARY EMBODIMENT

Figure 2A:
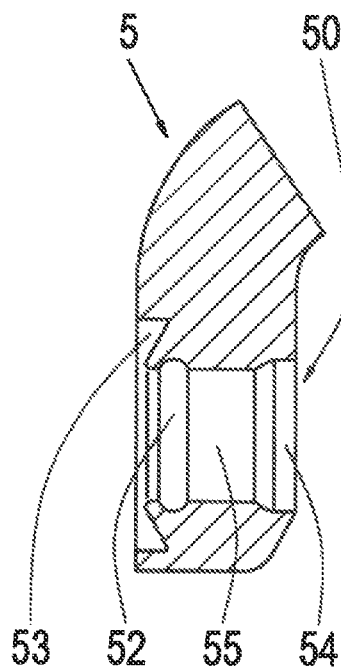
Figure 2B:
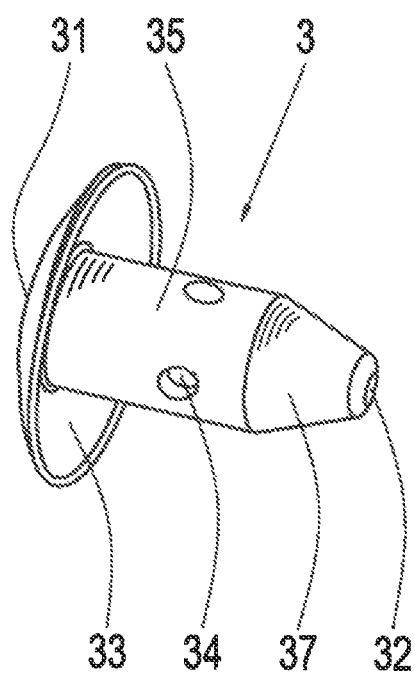
Figure 2C:
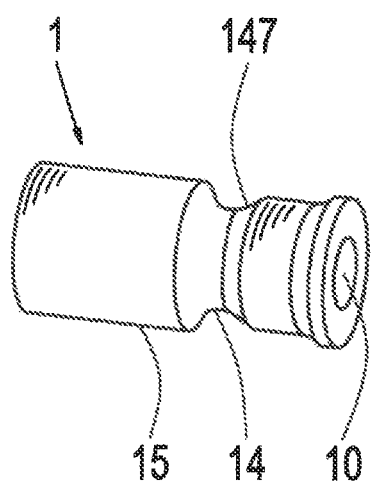
Figure 2D:
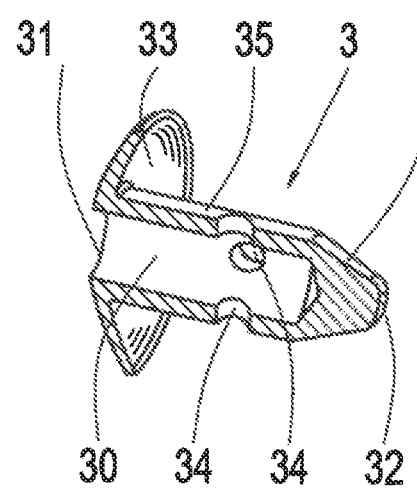
Figure 2E:
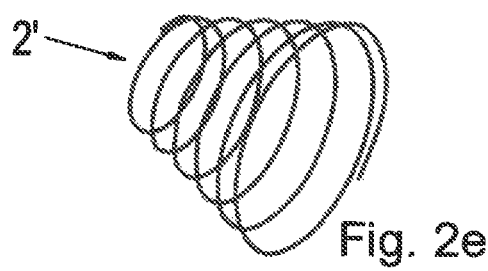
Figure 5A:
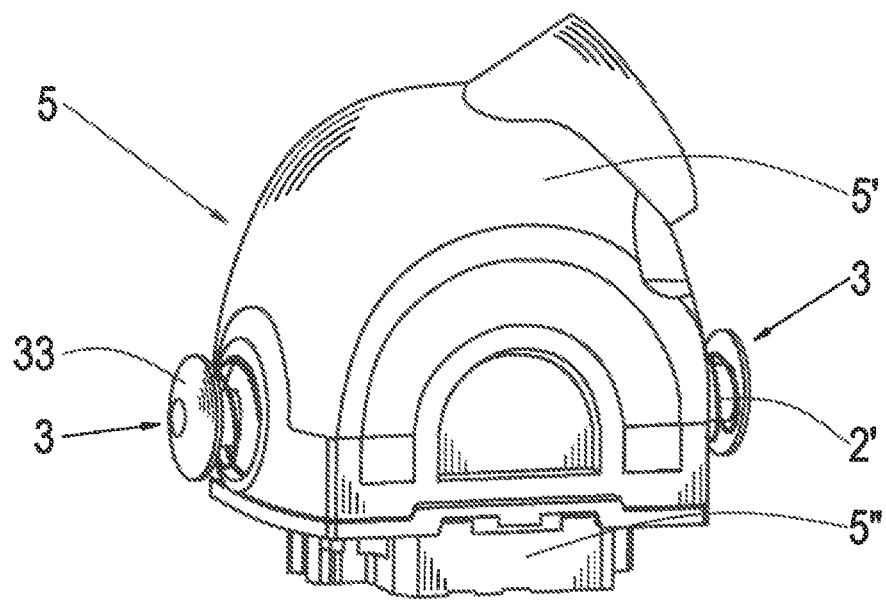

An exemplary embodiment of the invention is shown in the drawings and is explained in more detail below. The drawings are as follows:

FIGS. 1a, b showing an exploded representation of a push-button lock:

FIG. 2a showing a through-opening of a plug-in connector housing;

FIG. 2b showing a push-button body;

FIG. 2c showing an unlocking pin;

FIG. 2d showing the push-button body in cross section;

FIGS. 2e, f showing a conical spring in the relaxed state and in the compressed state;

FIGS. 3a-d showing a locking operation of a push-button lock;

FIGS. 4a-d showing an unlocking operation of the push-button lock;

FIGS. 5a, b showing a plug-in connector housing in the unlocked state and in the locked state.

The figures contain partially simplified, schematic representations. Identical reference symbols are used in part for the same but not necessarily identical elements. Various views of the same elements could be scaled differently.

FIGS. 1a and b each show an exploded representation of slightly different realizations of a push-button lock. In principle, the respective push-button lock has the following:

an unlocking pin 1 with a first spring 2 which is realized as a spiral spring,
a push-button body 3 with a substantially cylindrical unlocking opening 30 and multiple locking openings 34, a first end 31 and a second end 32 being designated on the push-button body and the push-button body comprising a plate-like push-button head 33 at its first end;
multiple locking elements which are realized in the form of locking balls 4, and which are provided for the purpose of being arranged in the locking recesses 34;
a second spring 2' which is realized as a conical spring;
a through-opening 50 of a plug-in connector housing 5.

In addition, the realization which is shown in FIG. 1a has a ball cage 6 which is formed by a cylindrically bent sheet. In another realization, the ball cage 6 can also be a tube. The ball cage 6 comprises circular holding openings which are not shown in any more detail and the diameter of which is smaller than the diameter of the locking balls 4.

Figure 1B:
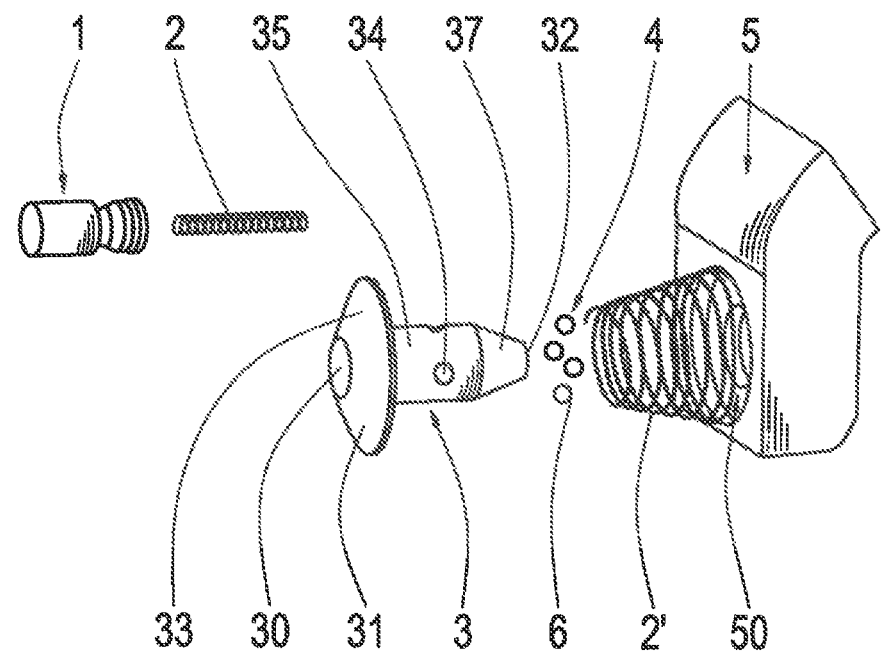

During assembly, the unlocking pin 1 is inserted into the unlocking recess 30 with the first spring 2 in front. As a result, the first spring 2 is put under mechanical tension and thus generates a first restoring force. The locking balls 4 are arranged in the locking openings 34 and, in the realization that is shown in FIG. 1a, are surrounded by the ball cage 6 in order to prevent the locking balls 4 falling out. In the case of the realization shown in FIG. 1b, the locking openings 34 are embossed for this purpose once the locking balls 4 have been inserted in order to prevent the locking balls 4 failing out of the push-button body 3.

As a result of the locking balls 4 being held in such a manner in the locking openings 34 of the push-button body 3, the unlocking pin 1 is also held captively in the unlocking recess 30 of the push-button body 3.

FIG. 2a shows a detail of a plug-in connector housing 5 with a substantially cylindrical through-opening 50. Said through-opening 50 has an inside contour with a ring-shaped circumferential locking recess 54. In addition, it has a ring-shaped circumferential holding recess 52. A cylindrical region is situated between the locking recess 54 and the holding recess 52. In addition, it has, on its first end, a receiving means 53 for a push-button head 33 of the push-button body 3 as well as for the second spring 2' or at least part thereof.

FIG. 2b shows a 3D representation of the push-button body 3 and FIG. 2d shows a cross sectional representation of said push-button body.

The push-button body 3 has a first end 31 and a second end 32. On the first end 31, the push-button body 3 has plate-like push-button head 33 which is designed in the manner of a spherical surface segment and prevents the push-button body 3 being inserted into the through-opening 50. Adjoining this, it comprises a cylindrical portion 35 with locking openings 34 and connecting thereto a conical end portion 37 which tapers toward the second end 32. Beginning at the first end, the push-button body has said cylindrical unlocking recess 30 which is connected to the surface of the push-button body 3 via the locking openings 34.

The unlocking pin 1 shown in FIG. 2c has a substantially cylindrical shape, i.e. at least one cylindrical pin 15 with a circumferential unlocking recess 14 which comprises a restoring chamfer 147. In addition, the unlocking pin 1 has a receiving recess 10 for receiving the first spring 2. Said first spring 2, which is realized as a spiral spring, can be arranged in the compressed state fully or at least largely inside said receiving recess 10.

Figure 2F:

FIGS. 2e and 2f show the second spring 2', which is realized in the form of a conical spring, in a relaxed state and a compressed state.

FIGS. 3a to 3d provide a locking operation.

Figure 3A:
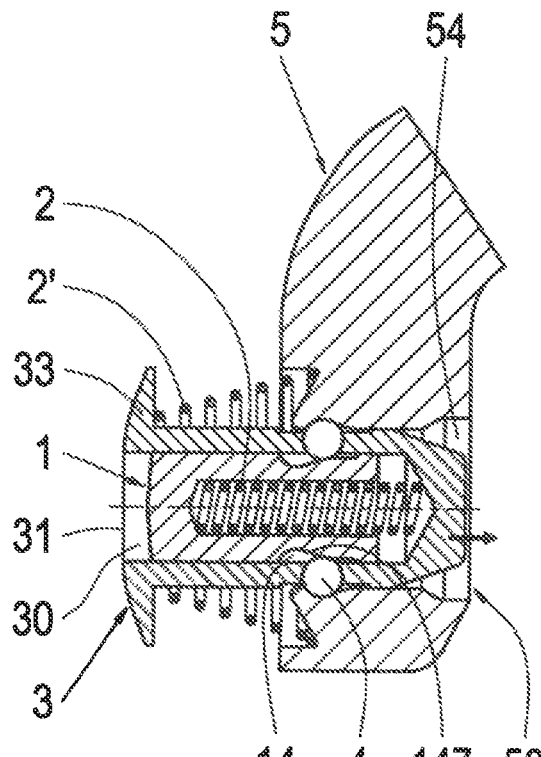

The push-button body 3, as shown in FIG. 3a, is manually inserted deeper into the through-opening 50 of the plug-in connector housing 5 so that it is moved toward the plug-in connector housing 5 with its first end 31 and its push-button head 33.

Figure 3B:
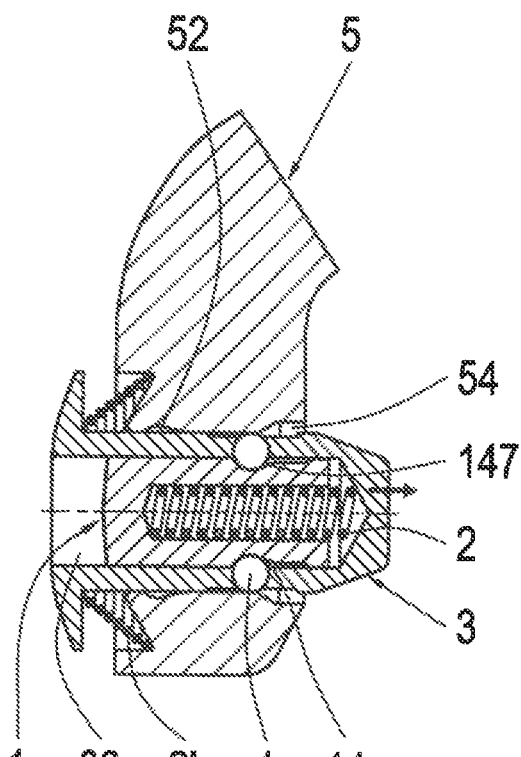

As a result, the unlocking ball 4 is pressed by the inside contour of the through-opening 50, in particular the associated holding recess 52, deeper into the unlocking recess 14. As a result of its interaction with the restoring chamfer 147, the unlocking pin 1, as shown in FIG. 3b, is in this case automatically moved even deeper marginally into the unlocking opening 30 against the first restoring force of the first spring 2. Said operation takes places automatically without additional manual actuation, i.e. the unlocking pin 1 has already moved automatically initially a little deeper into the unlocking opening 30 relative to the push-button body 3 as a result of the push-button body 3 being manually pressed into die through-opening 50. In the relative position of the unlocking pin 1 to the push-button body 3 readied as a result, the unlocking pin 1 is moved together with the push-button body 3 with the locking ball 4 along the cylindrical region 55 in the direction of the locking recess 54.

Figure 3C:
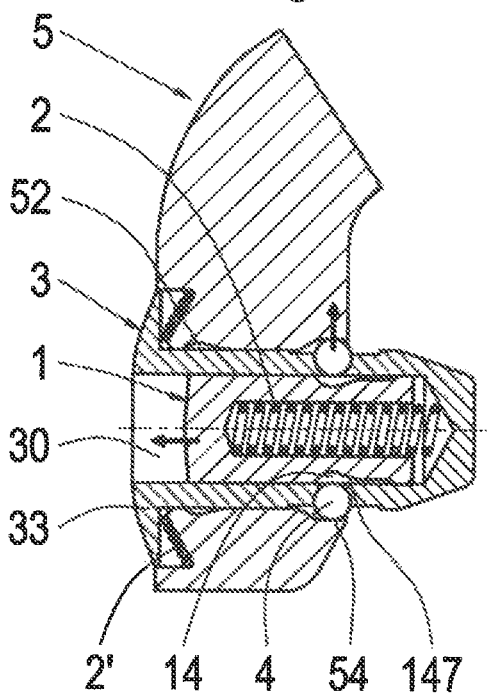

FIG. 3c shows how the unlocking ball 4 is pressed into the locking recess 54 as a result of the first restoring force of the first spring 2 and of the restoring chamfer 147 when the position of the locking recess 54 is reached. The second restoring force of the second spring 2' does not take effect at said moment on account of the actuating force which is in opposition to it and acts on the push-button body 3.

Figure 3D:
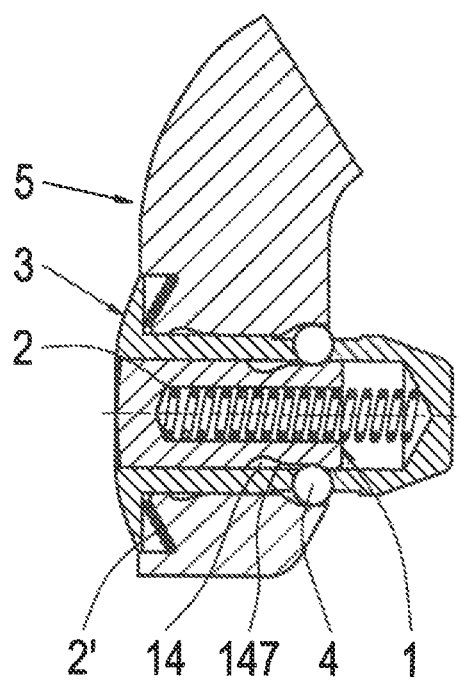

As a result of the locking ball 4 now being received deeper in the locking recess 54, that is to say at the same time being removed from the unlocking recess 14 of the unlocking pin 1, the unlocking pin 1 is released from its fixing on the push-button body 5 and springs into its non-actuated position, as shown in FIG. 3d. At the same time, the outside contour of the unlocking pin 1 fixes the push-button body 3 in its locking position on the plug-in connector housing 5.

Figure 4A:
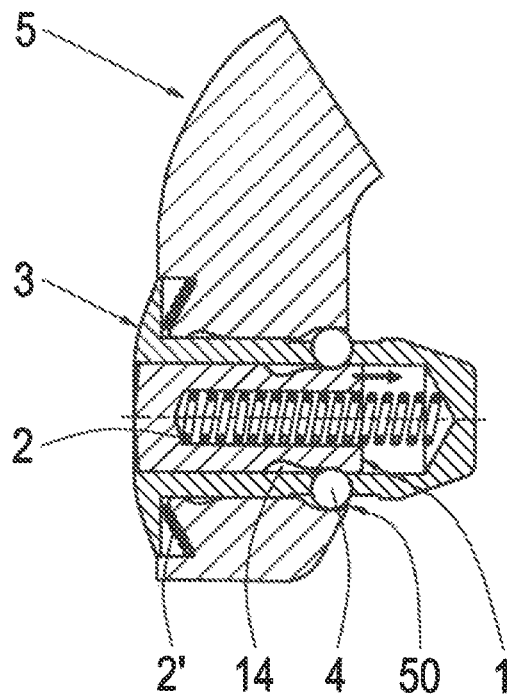

FIGS. 4a to 4d show an unlocking operation. For this purpose, the unlocking pin 1, as shown in FIG. 4a, is pushed, for example with a tool such as a screwdriver or a pin among other things, in the direction of the arrow into the unlocking opening 30 of the push-button body 3.

Figure 4B:
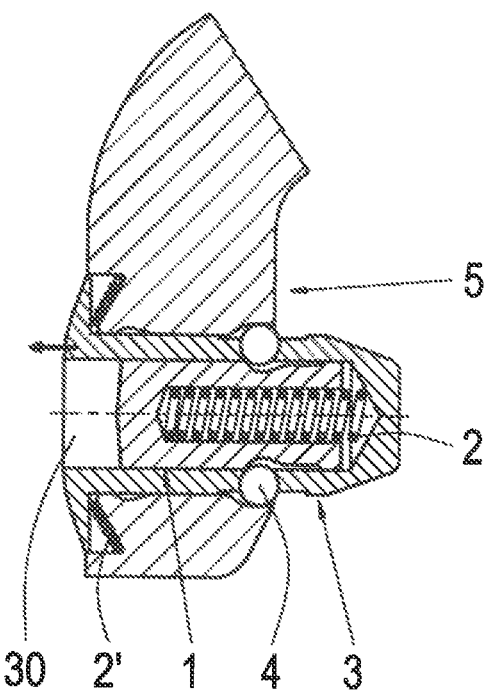

It can be seen in FIG. 4b how the locking ball 4 is pushed into the unlocking recess 14 of the unlocking pin 1. This occurs as a result of the second restoring force of the second spring 2' acting on the push-button body 3, with interaction with the inside contour of the through-opening 50, namely with the locking recess 54 which, in turn, has, for this purpose, a chamfer which is not designated in any more detail. Care must be taken in this case to ensure that the second restoring force, in contrast to the aforementioned locking operation, is not compensated for here by an actuating force acting in the opposite direction. Instead of this, the first restoring force of the first spring 2 is compensated for at said moment by the actuating force which acts on the unlocking pin 1 in the direction of its actuated position.

Figure 4C:
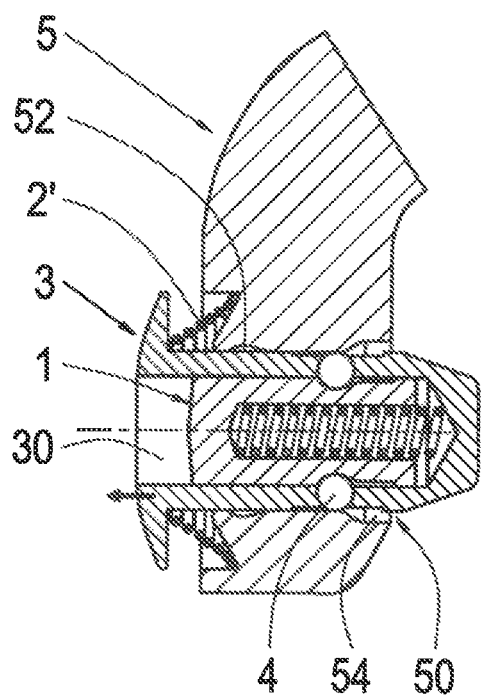

FIG. 4c shows how the push-button body 3 is pushed out of the plug-in connector housing 5 by the second restoring force, i.e. by the second spring 2', as soon as the locking ball 4 has been removed from the locking recess 54.

Figure 4D:
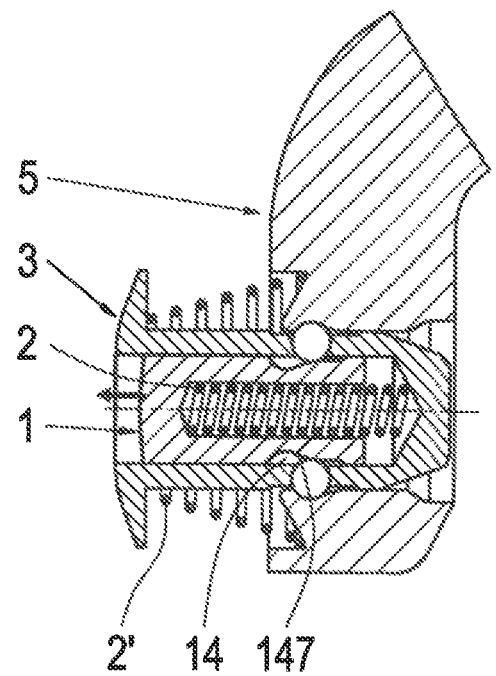

FIG. 4d shows the arrangement finally in an unlocked state. The locking ball 4, in this case, is inserted into the holding recess 52 of the plug-in connector housing 5. The unlocking pin 1 is held with its restoring chamfer 147 on the locking ball 4 and is situated in its holding position.

Figure 5B:
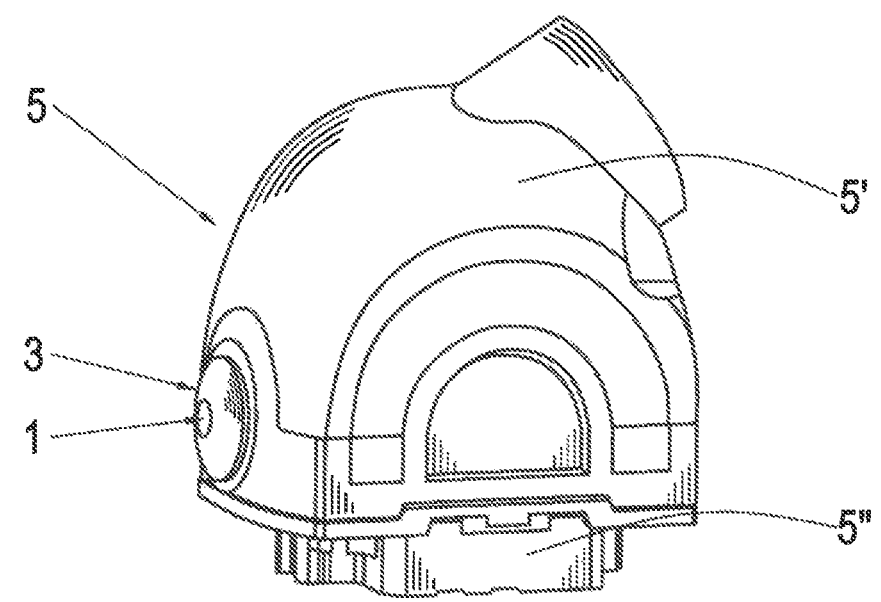

FIGS. 5a and 5b show the plug-in connector housing 5, consisting of a first housing part 5' and a second housing part 5", in the unlocked state and in the locked state. The second housing part 5" is a so-called "attachment housing" which can be mounted, for example, on a wall breakthrough. The first housing part 5' is placed thereon, as shown in the drawing.

As a result of compressing the two push-button bodies 3, the second housing part 5" is locked on the first housing part 5', i.e. the entire plug-in connector housing 5 is locked. As a result of pressing in the unlocking pins 1, the push-button bodies 3 spring into their unlocking position again and the plug-in connector housing 5 is once more unlocked.

Said operating concept is very convenient and to a large extent self-explanatory.

Even if various aspects or features of the invention are shown in combination in each case in the figures, it is obvious to the expert—insofar as nothing to the contrary is specified—that the combinations shown and discussed are not the sole possible ones. In particular, it is possible for units which correspond to one another or feature complexes which are produced from various exemplary embodiments to be exchanged with one another.

LIST OF REFERENCES

1 Unlocking pin
10 Receiving recess
14 Unlocking recess

147 Restoring chamfer
15 Cylindrical pin portion
2 First spring, spiral spring
2' Second spring, conical spring
3 Push-button body
30 Unlocking opening
31 First end
32 Second end
33 Push-button head
34 Locking opening
35 Cylindrical portion
37 Conical end portion
4 Locking elements/locking balls
5 Plug-in connector housing
50 Through-opening of the plug-in connector housing
52 Holding recess
53 Receiving means
54 Locking recess
55 Cylindrical region
5', 5| First, second housing part
6 Ball cage

The invention claimed is:

1. A push-button lock for a plug-in connector housing, wherein the push-button lock comprises at least the following:
   a. the push-button body which, beginning at its first end and extending in the direction of its opposite second end, has an unlocking opening for receiving an unlocking pin;
   b. the unlocking pin which is arranged in the unlocking opening so as to be movable relative to the push-button body, is actuatable as a result and in its non-actuated position is able to fulfill a function locking the plug-in connector housing and in its actuated position is able to fulfill a function unlocking the plug-in connector housing;
   c. a first spring configured to apply a first restoring force for transferring the unlocking pin from its actuated position into its nor-actuated position;
   d. a second spring configured to generate a second restoring force, for transferring the push-button body from a position locking the plug-in connector housing into a position unlocking the plug-in connector housing;
   e. at least one locking element which is arranged so as to be movable a least in regions in or on the push-button body for interacting with the unlocking pin, the push-button body and the plugin connector housing.

2. The push-button lock as claimed in claim 1, wherein the push button body has at least one locking opening for the at least partial receiving of the at least one locking element, wherein the at least one locking opening connects the surface of the push-button body to its unlocking opening.

3. The push-button lock as claimed in claim 2, wherein the at least one locking element is configured to be movable in the at least one locking opening of the push-button body.

4. The push-button lock as claimed in claim 3, wherein the unlocking pin comprises an outside contour which interacts with the at least one locking element in order to move the at least one locking element into the at least one locking opening.

5. The push-button lock as claimed in claim 4, wherein the outside contour of the unlocking pin includes at least one unlocking recess.

6. The push-button lock as claimed in claim 5, wherein the unlocking recess comprises a restoring chamfer.

7. The push-button lock as claimed in claim 1, wherein the at least one locking element is a locking ball.

8. The push-button lock as claimed in claim 1, wherein the unlocking opening is realized in a substantially cylindrical manner and wherein the unlocking pin is also realized in a cylindrical manner or has at least one substantially cylindrical pin portion, wherein the diameter of the unlocking pin or the diameter of its cylindrical diameter pin portion is smaller than or equal to the diameter of the unlocking opening, as a result of which the unlocking pin in movable in the push-button body and as a result is actuatable.

9. The push-button lock as claimed in claim 1, wherein the spring is a spiral spring which is arranged in the unlocking opening between the second end of the push-button body and at least on part of the unlocking pin in order to exert said first restoring force on said push-button lock.

10. The push-button lock as claimed in claim 9, wherein the unlocking pin has a receiving recess in which the first spring engages.

11. A system comprising the push-button lock as claimed in claim 1 and the plug-in connector housing, wherein the plug-in connector housing comprises at least two housing parts, wherein at least one of the two housing parts comprises a through-opening on each of two housing walls situated opposite one another, wherein for locking the plug-in connector housing, one push-button body each is arranged in each of the two through-openings, wherein said two push-button bodies are movable manually toward one another and using said second spring away from one another for locking and unlocking the plug-in connector housing.

12. The system as claimed in claim 11, wherein the second spring is a conical spring which cooperates at the one end with the plug-in connector housing and at the other end with the push-button body.

13. The system as claimed in claim 11, wherein each of the two through-openings comprises at least one locking recess which interacts with the locking elements in order to fix the push-button body on the plug-in connector housing or to release it from the same.

14. The system as claimed in claim 11, wherein the unlocking pin allows the locking element to be inserted deeper into the push-button body in its actuated position than in its non-actuated position.

15. The system as claimed in claim 14, wherein, in its actuated position, the unlocking pin with at least one unlocking recess situated on its surface is arranged on the at least one locking element in order to enable it to be inserted deeper into the push-button body, in order, consequently, to remove the at least one locking element out of the locking recess of the plug-in connector housing.

16. The system as claimed in claim 11, wherein the push-button body has a conical progression at its second end in order to actuate a locking and unlocking mechanism of the plug-in connector housing by said conical progression.

17. A method for unlocking a plug-in connector housing, in particular with a push-button lock as claimed in claim 1, comprising the following steps, in sequence:
   A. actuating an unlocking pin by manually inserting the unlocking pin into an unlocking opening of a push-button body fixed on the plug-in connector housing in opposition to a first restoring force of a first spring,
   B. inserting the at least one locking element deeper into the push-button body as a result of interaction between the outside contour of the unlocking pin and the locking element,
   C. releasing the fixing of the push-button body from the plug-in connector housing as a result of interaction between the locking element and an inside contour of a through-opening in which the push-button body is held so as to be movable, and D. transferring the push-button body automatically into a position unlocking the plug-in connector housing as a result of a second restoring force of a second spring.

18. The method as claimed in claim 17, further comprising the following subsequent step:

E. positioning the at least one locking element at a holding recess of the plug-in connector housing and at the same time press the locking element into the holding recess using the first spring interacting with a restoring chamfer of the unlocking pin.

19. The method as claimed in claim 17, wherein the interaction between the outside contour of the unlocking pin and the locking element described in step B comprises in at least one unlocking recess of the unlocking pin moving toward the at least one locking element, thereby making it possible for the at least one locking element to be inserted deeper into the push-button body.

20. A method for locking a plug-in connector housing, in particular with a push-button lock as claimed in claim 1, comprising the following steps, in sequence:

I. manually pressing at least one firstly unlocked push-button body into a through-opening of a housing side of a plug-in connector housing, in which the push-button body is held so as to be movable;

II. holding an unlocking pin received in the push-button body automatically in a position fixing in unlocking pin on the push-button body;

III. moving the push-button body with its at least one locking opening and an at least one locking element received therein to a locking recess of the through-opening; and IV. fixing the push-button body on the plug-in connector housing in its locking position as a result of interaction between the respective unlocking pin, the respective push-button body and the respective through-opening and the at least one locking element using the locking recess of the through-opening.

21. The method as claimed in claim 20, wherein in method steps II and III, the unlocking pin is fixed on the push-button body as a result of interaction between the locking element and in inside contour of the through-opening.

22. The method as claimed in claim 20, wherein in method step IV, the push-button body is fixed on the plug-in connector housing as a result of interaction between the locking element and an outside contour of the unlocking pin and the locking recess of the through-opening.

* * * * *

UNITED STATES PATENT AND TRADEMARK OFFICE
CERTIFICATE OF CORRECTION

PATENT NO. : 11,384,785 B2
APPLICATION NO. : 16/629503
DATED : July 12, 2022
INVENTOR(S) : Schlegel et al.

It is certified that error appears in the above-identified patent and that said Letters Patent is hereby corrected as shown below:

In the Claims

Claim 9, Column 12, Line 11, "spring is a spiral spring" should be --first spring is a spiral spring--.

Signed and Sealed this
Twentieth Day of August, 2024

Katherine Kelly Vidal
*Director of the United States Patent and Trademark Office*